United States Patent [19]
Ohta et al.

[11] Patent Number: 5,535,586
[45] Date of Patent: Jul. 16, 1996

[54] ENGINE IGNITION PERIOD CONTROLLER

[75] Inventors: Kenji Ohta; Hiroshi Twano, both of Yokosuka; Hatsuo Nagaishi, Yokohama, all of Japan

[73] Assignee: Nissan Motor Co., Ltd., Kanagawa, Japan

[21] Appl. No.: 55,017

[22] Filed: Apr. 30, 1993

[30] Foreign Application Priority Data

May 7, 1992 [JP] Japan .................................. 4-114846

[51] Int. Cl.$^6$ ................................................ F01N 3/28
[52] U.S. Cl. .......................... 60/285; 60/284; 123/418; 123/421; 123/422; 123/424
[58] Field of Search ................... 60/285, 284; 123/418, 123/421, 422, 424

[56]  References Cited

U.S. PATENT DOCUMENTS

| | | | |
|---|---|---|---|
| 4,351,297 | 9/1982 | Suematsu | 123/421 |
| 4,367,711 | 1/1983 | Ikeura | 123/421 |
| 4,574,588 | 3/1986 | Hayama | 60/285 |
| 4,702,211 | 10/1987 | Kato | 123/421 |
| 4,703,733 | 11/1987 | Fukutomi | 123/421 |
| 5,050,551 | 9/1991 | Morikawa | 60/285 |
| 5,211,011 | 5/1993 | Nishikawa | 60/285 |
| 5,271,367 | 12/1993 | Abe | 123/421 |

FOREIGN PATENT DOCUMENTS

| | | |
|---|---|---|
| 57-75173 | 5/1982 | Japan . |
| 59-201970 | 11/1984 | Japan . |

*Primary Examiner*—Douglas Hart
*Attorney, Agent, or Firm*—Lowe, Price, Leblanc & Becker

[57]  ABSTRACT

A mechanism for computing the basic ignition period of a spark plug from engine running conditions, a mechanism for judging whether or not the running conditions are within a delay correction region, and a mechanism for computing a basic delay amount if the running conditions are within the delay correction region, are provided. The accelerator opening or throttle opening are detected, and after the delay amount has been corrected according to the detected opening, the basic ignition period is corrected by the basic delay amount. The spark plug thereby ignites the fuel with the corrected ignition period, and the engine catalyst is activated early without impairing engine running performance after engine start-up.

8 Claims, 6 Drawing Sheets

ENGINE IGNITION PERIOD CONTROLLER

FIELD OF THE INVENTION

Invention relates to a device for controlling the ignition period of an engine according to engine running conditions.

BACKGROUND OF THE INVENTION

The ignition period required in an engine generally differs according to the engine running conditions, and a basic ignition period is therefore usually set to an MBT (Minimum spark advance for best torque) which varies according to engine load and engine rotation speed. All additional correction of the basic ignition period is made for engine cooling water temperature so as to improve warm-up performance immediately after starting the engine or to prevent knocking on high load.

An ignition period controller which controls knocking by applying a delay correction related to engine cooling water temperature to the ignition period is for example disclosed in Tokkai Sho 59-201970 published by the Japanese Patent Office.

To prevent knocking, it would be appropriate to delay the ignition period under running conditions in which knocking tends to occur easily such as when the engine is at a high temperature, but this delay also leads to a decrease of engine torque. It is therefore necessary to limit the delay correction to a minimum.

For this purpose, this controller has been made to prevent knocking while maintaining engine output performance by applying a delay correction to the ignition period based on one of two characteristics, i.e. a delay characteristic where the delay amount increases depending on increase of engine temperature, and a delay characteristic where the delay amount increases depending on increase of engine load. Of these two characteristics, the delay characteristic is chosen which gives the lesser delay amount.

In exhaust purification systems employing a three-way catalyst which oxidizes HC and CO while simultaneously reducing NO, the desired exhaust purification efficiency is obtained only when the catalyst has reached an active state above a predetermined temperature. In other words, the exhaust purification efficiency is low, for example when the engine has a cold start, until the catalyst temperature rises.

For example, in the ignition period controller disclosed in Jikkai Sho 57-75173 published by the Japanese Patent Office, the ignition period is delayed so as to increase exhaust temperature when the engine cooling water temperature is low, and the catalyst is activated as soon as possible after start-up. This also helps the engine to warm up.

However, as a uniform delay correction amount is normally applied to the basic ignition period depending on the cooling water temperature, torque insufficiency or sturge may occur, especially when the engine is on high load, if the running load increases during the delay period. For example, if the engine accelerates before it has completely warmed up, or if it is run on high load, the ignition period is too much delayed even if the basic ignition period is adjusted according to the load, with result that the output torque decreases, fuel costs increase and performance deteriorates.

If on the other hand the lesser delay amount is chosen from two delay characteristics of the ignition period as in the case of the Tokkai Sho 59-201970, decrease of output torque can be considerably suppressed. However, even in this controller, the ignition period is delayed the greater the load or the higher the temperature of the cooling water, so prevention of knocking is still being emphasized at the expense of engine performance. In this controller too therefore, the deterioration of acceleration performance during warm-up is inevitable.

Moreover, after depressing the accelerator pedal to a certain opening in order to accelerate the vehicle, when for example the acceleration is continued with the same accelerator opening, intake negative pressure varies with the engine rotation speed even if the accelerator opening does not vary. If the intake negative pressure is chosen as representative of engine load in order to control the ignition period, the delay amount of the ignition period varies depending on the change of intake negative pressure. The output torque therefore fluctuates while the accelerator opening is constant, and in the case of an automobile engine, this fluctuation deteriorates the driving response of the vehicle.

SUMMARY OF THE INVENTION

It is therefore an object of this invention to activate the catalyst in an internal combustion engine with minimum delay without adversely affecting the running performance of the engine.

It is a further object of this invention to eliminate fluctuations of output torque for a given accelerator opening when the ignition period of the engine is delayed.

It is yet a further object of this invention to delay the ignition period only as much as is necessary as required by the activation state of the catalyst, even when the activation state of the catalyst does not correspond to the engine running conditions.

In order to achieve the above objects, this invention provides an engine ignition period controller provided with a spark plug for igniting a fuel mixture supplied to the engine, an exhaust passage and a catalyst installed in the exhaust passage for cleaning the exhaust. This controller further comprises a mechanism for detecting engine running conditions, a mechanism for computing a basic ignition period of the spark plug from the detected running conditions, a mechanism for setting a driving region for applying a delay correction to the ignition period as required in order to activate the catalyst, a mechanism for judging whether or not the detected running conditions are within the delay correction region, a mechanism for computing a basic delay amount based on the running conditions when the running conditions are within the delay correction region, a mechanism for detecting the accelerator opening or the throttle opening, a mechanism for computing a corrected value of the basic delay amount according to the detected opening, a mechanism for correcting the basic delay amount based on the computed corrected value, a mechanism for correcting the basic ignition period based on the corrected delay amount, and a mechanism for igniting the fuel mixture by the spark plug based on the corrected ignition period.

Preferably, the mechanism for detecting the engine running conditions comprises sensors for detecting engine load, engine rotation speed, and engine cooling water temperature.

Also preferably, the mechanism for detecting the engine running conditions comprises at least a sensor for detecting the engine cooling water temperature, the setting mechanism assigns a delay correction region to the engine cooling water temperature, and the judging mechanism judges whether or not the running conditions are within a delay correction region based on the engine cooling water temperature. Alternatively, the controller may further comprises means for detecting engine running conditions, a mechanism for computing a basic ignition period of the spark plug from the detected running conditions, a mechanism for detecting a catalyst temperature, a mechanism for setting a driving region for applying a delay correction to the ignition period according to the catalyst temperature, a mechanism for judging whether or not the detected catalyst temperature is within the delay correction region, a mechanism for computing a basic delay amount based on the detected catalyst temperature when the catalyst temperature is within the delay correction region, a mechanism for detecting the accelerator opening or the throttle opening, a mechanism for computing a corrected value of the basic delay amount according to the detected opening, a mechanism for correcting the basic delay amount based on the computed corrected value, a mechanism for correcting the basic ignition period based on the corrected delay amount, and a mechanism for igniting the fuel mixture by the spark plug based on the corrected ignition period. The mechanism for detecting the engine running conditions comprises for example sensors for detecting engine load and engine rotation speed.

The details as well as other features and advantages of the invention are set forth in the remainder of the specification and are shown in the accompanying drawings.

DESCRIPTION OF THE PREFERRED EMBODIMENTS

Figure 1:
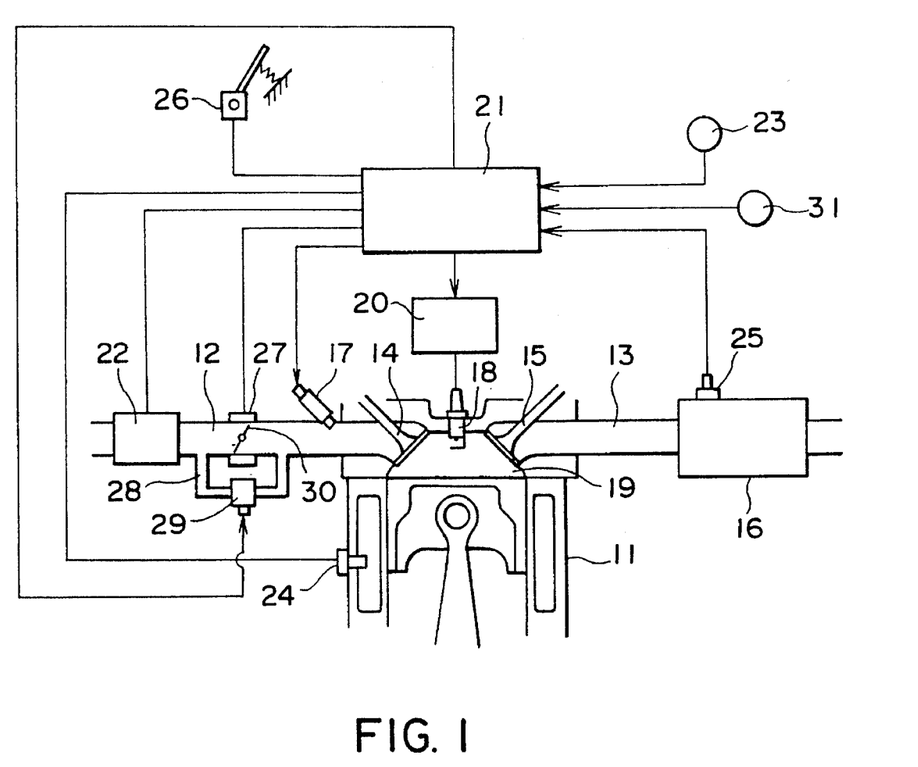
FIG. 1 is a schematic diagram of an ignition period controller according to this invention.

Referring to FIG. 1 of the drawings, an intake air passage 12 is connected to an exhaust passage 13 in a vehicle engine 11. An intake valve 14 is installed between a combustion chamber 19 and the intake passage 12, while an exhaust valve 15 is installed between this combustion chamber 19 and the exhaust passage 13.

An air flow sensor 22 for detecting the intake air amount and a throttle valve 30 for controlling the intake air amount are installed in the intake air passage 12, an idle control valve 29 is installed in a bypass passage 28 bypassing the throttle valve 30, and a fuel injector 17 is installed downstream of the throttle valve 30 for injecting fuel.

A three-way catalyst 16 is installed in the exhaust passage 13 for oxidizing HC and CO, and reducing NO, in the exhaust gas. This three-way catalyst 16 is provided with a catalyst temperature sensor 25.

A spark plug 18 for igniting the fuel mixture is provided in the combustion chamber 19.

The accelerator pedal is provided with an accelerator opening sensor 26, the throttle valve 30 is provided with a throttle opening sensor 27, and a water jacket is provided with a cooling water temperature sensor 24.

A controller 21 is provided to control the fuel amount injected by the fuel injector 17, and the ignition period of the spark plug 18. Signals from the aforesaid sensors, from an engine speed sensor 23 for detecting engine speed and from an idle sensor 31 for detecting an idle condition of the engine are input to this controller 21.

To maintain the three-way catalyst 16 at its maximum conversion efficiency, the controller 21 computes a fuel injection amount depending on the intake air volume detected by the air flow sensor 22, and on the engine speed detected by the engine speed sensor 23. The fuel injection amount injected by the fuel injector 17 is then controlled to the computed value.

The controller 21 also computes a fuel injection pulse width and a basic ignition period depending on the engine speed such that the ignition period of the spark plug 18 is optimized according to the running conditions.

During engine warm-up, this basic ignition period is delayed depending on the activation state of the three-way catalyst 16. This delay correction is performed based on the signal input from the engine cooling water temperature sensor 24 or the catalyst temperature sensor 25, and the signal input from the accelerator opening sensor 26 or the throttle opening sensor 27.

Until the engine has warmed up, as for example when the engine makes a cold start, the temperature of the three-way catalyst 16 is low and it is not activated, so it cannot function properly. The ignition period is therefore delayed with respect to the basic ignition period to increase the exhaust temperature, and activate the three-way catalyst 16 earlier.

The amount by which the ignition period is delayed is corrected based on the accelerator opening so that the engine output is not impaired even if the vehicle is accelerated during warm-up.

The controller 21 also controls the opening of the idle control valve 29 such that idle rotation does not decrease while the ignition period is being delayed.

The delay of the ignition period applied by the controller 21 during engine warm-up immediately after start-up will now be described using the flowchart of FIG. 2.

The controller 21 performs normal ignition period control to stabilize engine start-up, and then progresses to delay correction control depending on the cooling water temperature to promote warm-up after full explosion.

In a step 1, it is judged whether or not a starter switch of the engine is ON, and if it is ON, the program proceeds to steps 2–6.

Figure 2:
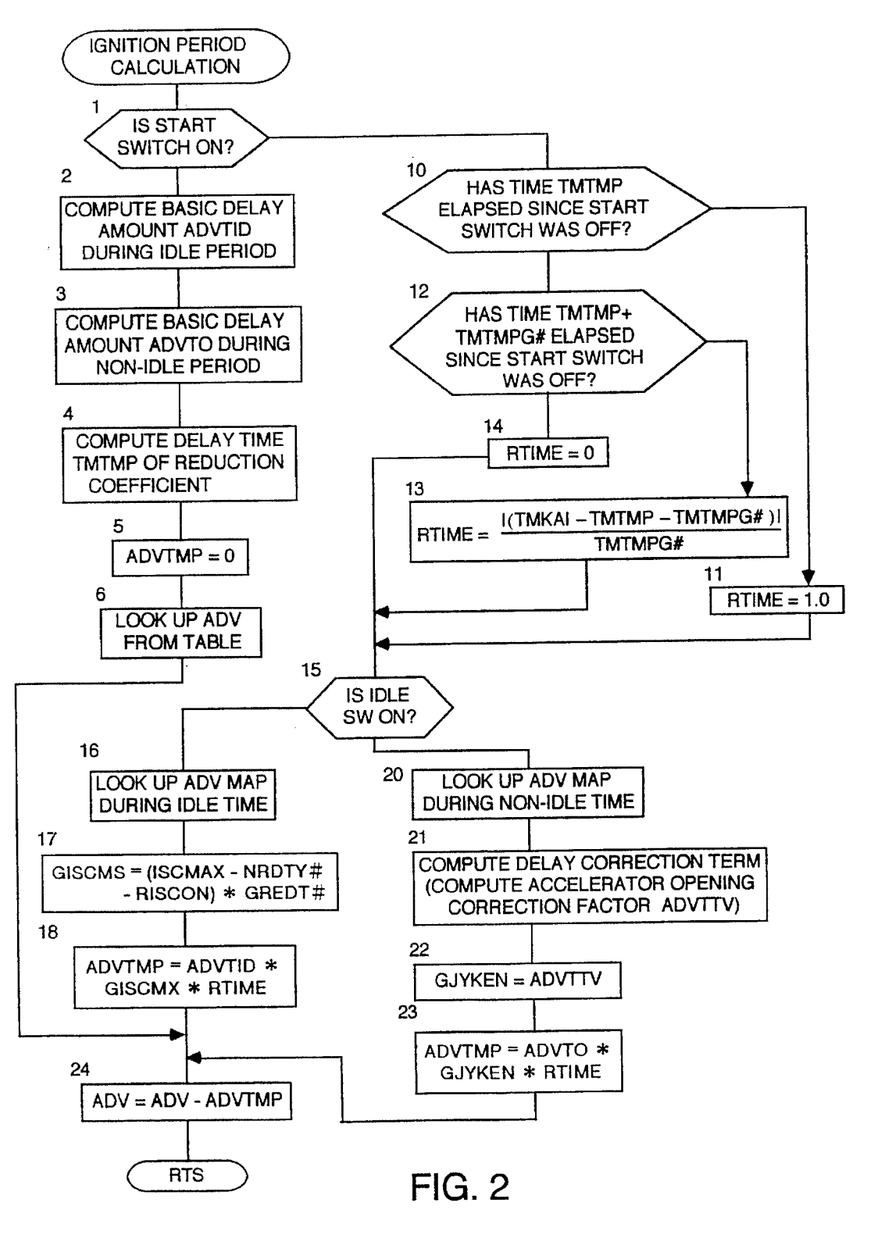
FIG. 2 is a flowchart showing a process for controlling an ignition period according to this invention.
Figure 3:
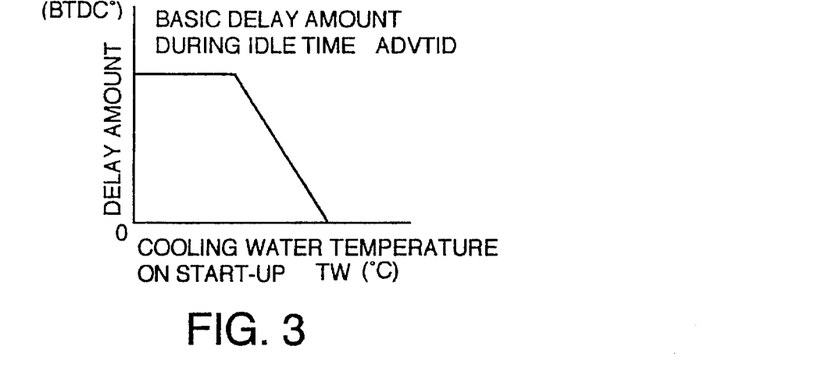
FIG. 3 is a graph showing a relation of a basic ignition delay amount ADVTID when the engine is idle and a water temperature Tw according to this invention.

Here, the controller 21 looks up a delay amount ADVTID of the ignition period during the idle period required to promote warm-up of the catalyst from a table corresponding to FIG. 3. This delay amount ADVTID is based on the cooling water temperature TW during start-up.

Figure 4:
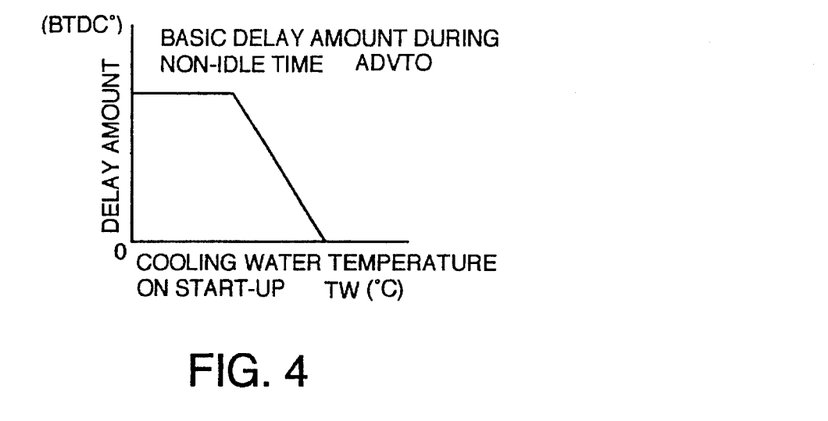
FIG. 4 is a graph showing a relation of a basic ignition delay amount ADVTO when the engine is not idle and the water temperature TW according to this invention.

At the same time, the controller 21 looks up a basic delay amount ADVTO during the non-idle period from a table corresponding to FIG. 4.

In order to promote catalyst warm-up, these basic delay amounts are set larger during idle periods which have little effect on drivability than during non-idle periods. If the cooling water temperature is higher than a predetermined value, the delay amount is zero. Therefore, by reading the basic delay amounts ADVTID, ADVTO, it can also be judged whether or not the vehicle is actually within the delay region.

Figure 5:
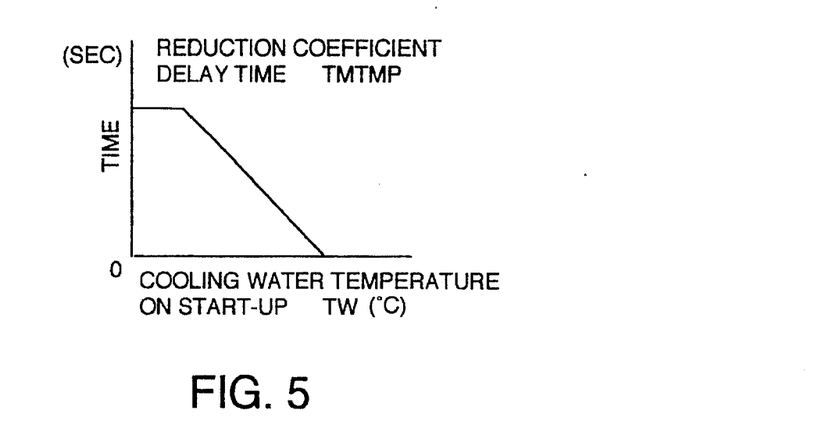
FIG. 5 is a graph showing a relation of a set time TMTMP and the water temperature TW according to this invention.

Further, to set the time for which the delay correction will be continued and to compute a reduction coeficient RTIME for reducing the correction amount depending on the length of time which has elapsed, the controller 21 looks up a delay time TMTMP based on the cooling water temperature TW from a table corresponding to FIG. 5.

In order to ensure a smooth start-up, a delay amount ADVTMP during start-up is set to 0. As the delay amount is then 0, the controller 21 looks up an ignition period ADV from a map, not shown, which sets normal ignition period data for start-up, and the value found is used as the ignition period without modification in a step 24.

During start-up, therefore, delay correction of the ignition period is not performed, and a smooth engine start-up is guaranteed.

After start-up is complete, i.e. after it has been detected that the starter switch is OFF, the program proceeds to steps 10–23, and the ignition period delay amount is computed based on the aforesaid delay data read during start-up.

In the step 10, it is judged whether or not the time elapsed since the starter switch is OFF, has reached the set value TMTMP based on the cooling water temperature. The value of TMTMP increases the lower the cooling water temperature during start-up, and expresses the length of time after start-up during which the ignition period is subject to a delay correction.

If the set time has not elapsed, the reduction coefficient RTIME is set to 1.0 in the step 11. As described hereinafter, the setting of the reduction coefficient RTIME to 1.0 signifies that the correction factor of the delay amount is 1.0, i.e. that the ignition period is delayed by the basic delay amount.

Figure 6:
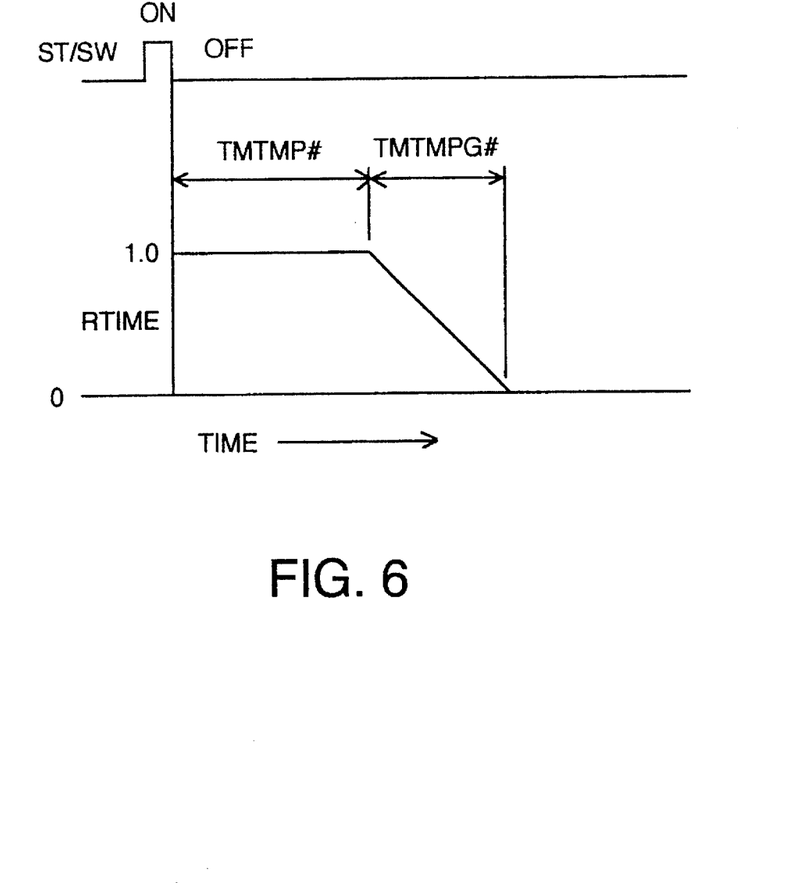
FIG. 6 is a timing chart showing a relation of a reduction coefficient RTIME and an elapsed time after a starter is switched off, according to this invention.

After the set time TMTMP has elapsed, it is judged in the step 12 whether or not a second set time TMTMPG# has elapsed. As shown in FIG. 6, this second set time TMTMPG# denotes a region in which the reduction coefficient RTIME gradually becomes smaller than 1.0. RTIME is computed as follows in the step 13:

$$RTIME = |(TMKAI - TMTMP) - TMTMPG\#|/TMTMPG\# \quad (1)$$

where TMKAI is a timer count after the starter switch is OFF.

The gradual decrease below 1.0 of the reduction coefficient RTIME is in order to reduce the computed delay correction amount when the time TMTMP has elapsed, and so prevent the ignition period from suddenly changing when the delay correction is completed.

After the set time (TMTMP+TMTMPG#) has elapsed, the reduction coefficient RTIME is set to 0 in the step 14.

After the reduction coefficients RTIME have been computed in this manner, the program proceeds to the step 15.

In the step 15, it is judged from the ON/OFF state of the idle switch 31 whether or not the engine is in the idle running state, and different delay correction characteristics are employed depending on the result of this decision. In other words, in the steps 16–18, the delay amount during the idle time is calculated, and in the steps 20–23, the delay amount during the non-idle time is calculated.

During the idle time, the controller 21 looks up the basic ignition period ADV required for idle running from a map, not shown, and then computes a correction factor GISCMX (value less than 1.0) from the following equation in order to prevent decrease of idle rotation speed due to delay of the ignition period:

$$GISCMX = (ISCMAX - NRDTY\# - RISCON) \times GRETD\# \quad (2)$$

where, NRDTY# and GRETD# are predetermined coefficients. ISCMAX is a control value where the idle control valve 29 has its maximum opening, and RISCON is a control duty value of the idle control valve 29. When the control duty is approaching the maximum value ISCMAX, i.e. when the idle control valve 29 is wide open in order to prevent decrease of idle rotation speed, therefore, the correction factor GISCMX approaches zero so that the delay amount is reduced.

In the step 18, the delay amount ADVTMP is calculated by the following equation from the aforesaid correction coefficients GISCMX and RTIME based on the aforesaid basic delay amount ADVTID read during start-up:

$$ADVTMP = ADVTID \times GISCMX \times RTIME \quad (3)$$

When the delay amount has been computed, the program proceeds to the step 24, and the basic ignition period ADV is corrected based on this delay amount ADVTMP.

The basic delay amount ADVTID increases the lower the cooling water temperature is, therefore the delay amount from the optimum ignition period is increased accordingly. Due to this delay, the exhaust temperature increases, and temperature increase of the three-way catalyst 16 is promoted.

Moreover, the correction coefficient GISCMX decreases the delay correction amount of the ignition period when the opening of the idle control valve 29 to maintain the idle rotation speed at a predetermined value is large, i.e. when there is not much leeway in the control for maintaining idle rotation. In this instance, stabilizing idle rotation is given preference over increasing exhaust temperature.

Further, as described hereintofore, the delay coefficient RTIME approaches zero and the delay amount gradually decreases as the time which has elapsed after start-up increases. When returning to the normal ignition period after completing the delay correction, therefore, there is no sudden change in the ignition period, and smooth running of the vehicle is maintained before and after delay control is applied.

Figure 7:
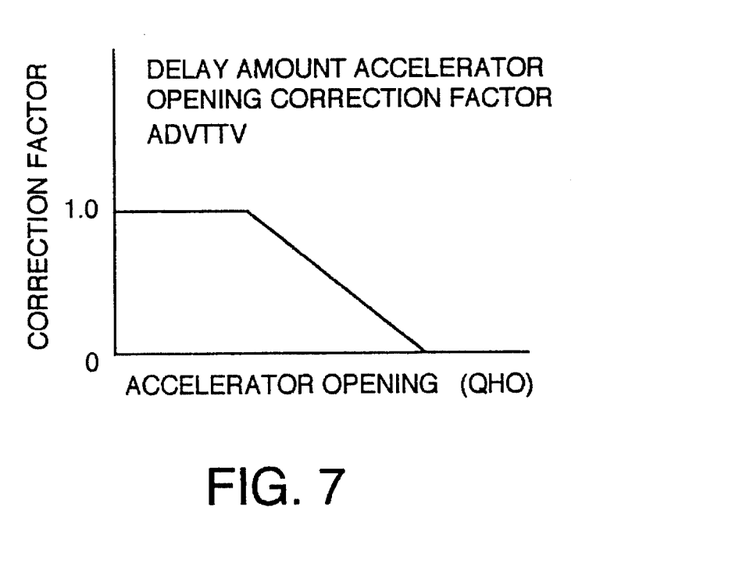
FIG. 7 is a graph showing a relation of a delay correction factor ADVTTV and a accelerator opening QHO according to this invention.

During the non-idle time, i.e. when the accelerator pedal is depressed, the program proceeds to the step 20, the controller 21 reads the ignition period ADV from a map, not shown, and then looks up a delay correction factor ADVTTV based on the accelerator opening or the throttle opening from a table corresponding to FIG. 7.

This delay correction factor is maintained at 1.0 until the accelerator opening reaches a predetermined value. If the accelerator opening increases further, the delay correction factor decreases and approaches zero so that the delay correction amount is zero in a predetermined high load region and drivability is not impaired.

Next, in the step 22, a correction term is replaced by setting GJYKEN equal to ADVTTV. This signifies that other elements can be added into the correction term, the sum total of these terms being represented by GJYKEN. If however as in this embodiment there are only correction terms for the accelerator opening or the throttle opening, this step may be omitted.

Then, in the step 23, a delay amount ADVTMP including this correction coefficient is computed by the following equation based on the basic delay amount ADVTO for the non-idle time read during start-up, and the basic ignition period is corrected in a step 25:

$$ADVTMP=ADVTO\times GJYKEN\times RTIME \quad (4)$$

Figure 8:
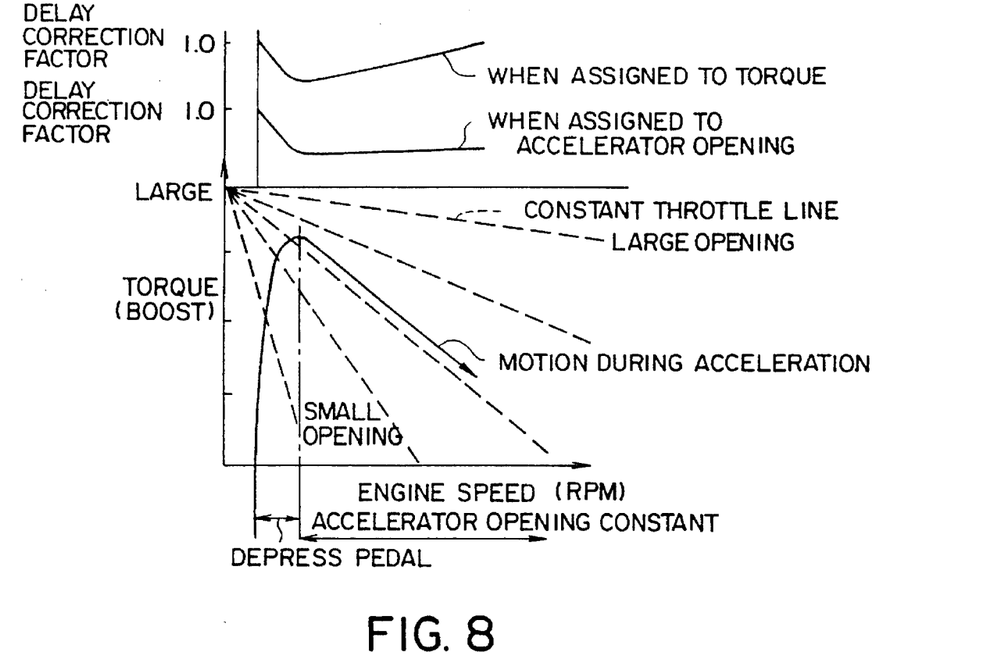
FIG. 8 is a graph showing a relation of the delay correction factor ADVTTV, torque characteristics and an engine rotation speed according to this invention.

This corrected delay amount ADVTMP therefore changes according to the accelerator opening or the throttle, opening. In the high load region, the delay amount is reduced, and running performance on high load is thereby maintained. Also as shown in FIG. 8, when the accelerator opening is constant, the delay correction factor does not change. There are therefore no sudden changes of torque during acceleration when the accelerator opening is constant, and smooth accelerator performance is obtained.

in such a case, the torque or intake pressure changes even if the accelerator opening does not change. If the delay amount of the ignition period were corrected based on the intake pressure, the ignition period would fluctuate even though the accelerator opening did not change, and the driving response of the vehicle would be deteriorated.

By making the correction term dependent on the accelerator opening or the throttle opening, this problem is eliminated, torque characteristics are stabilized, and smooth acceleration is obtained. In this embodiment, the delay amount of the ignition period is computed by detecting the engine cooling water temperature as a running condition. It is however also possible to compute the basic delay amount by detecting the actual temperature of the three-way catalyst 16, and thereby perform delay control according to the activation state of the catalyst.

Figure 9:
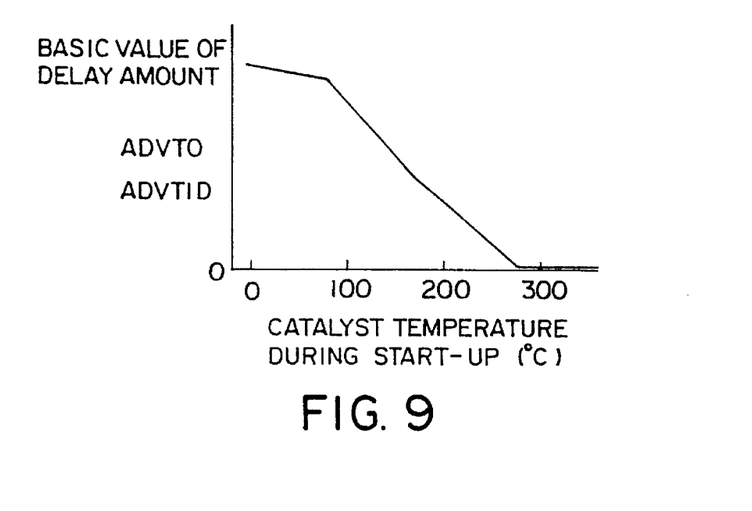
FIG. 9 is a graph showing a relation of the basic delay amounts ADVTO, ADVTID and a catalyst temperature according to this invention.

In this case, in steps 2 and 3 of the flowchart in FIG. 2, instead of reading the basic delay amount ADVTID during the idle time and the basic delay amount ADVTO during the non-idle time from FIG. 3 and FIG. 4, the controller 21 looks up these delay amounts from a map setting the relation between catalyst temperature and basic delay amount shown in FIG. 9 based on the output of the temperature sensor 25 of the three-way catalyst 16, and sets them equal to ADVTID and ADVTO.

Therefore, if the basic delay amount is set according to the actual temperature of the three-way catalyst 16, the ignition period is delayed even when the engine and catalyst warm-up states are not the same, as for example when the engine is restarted, and the actual temperature of the catalyst is low even though the cooling water temperature may be high. The result is that the catalyst temperature is rapidly increased, and the catalyst can be activated in a short time. Conversely, when the ignition period need not be delayed more than is necessary for increasing catalyst temperature, as for example when the engine cooling water temperature is low even though the catalyst temperature is high, increased fuel consumption due to the delay is kept to the absolute minimum.

Figure 10:
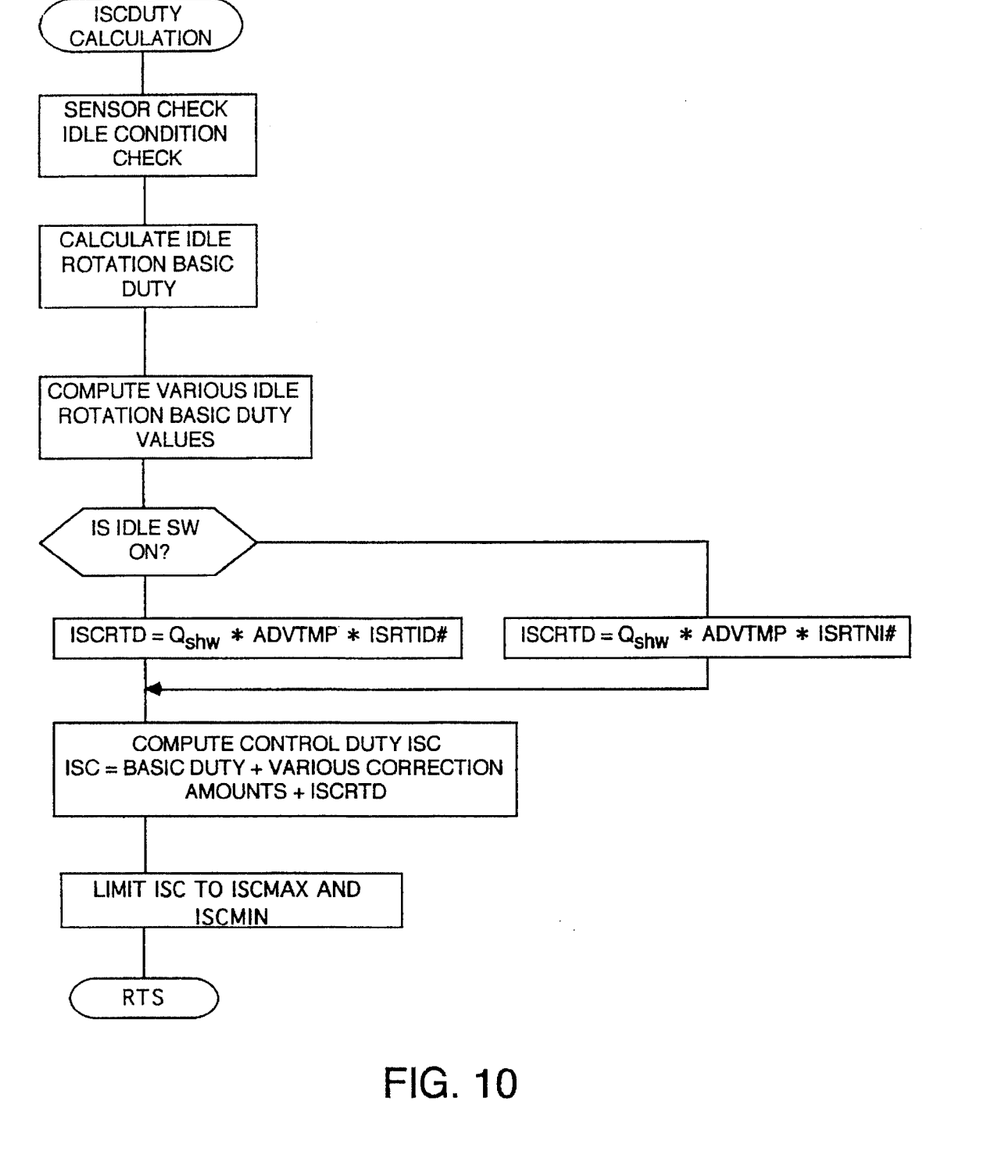
FIG. 10 is a flowchart showing a process for controlling an idle control valve according to this invention.

Next, the control for increasing and decreasing the opening of the idle control valve 29 through which air flows in order to bypass the throttle 30, so as to compensate for loss of torque when the ignition period is delayed, will be described with reference to the flowchart of FIG. 10.

When the ignition period is delayed, the torque generated tends to fall correspondingly. By bypassing the throttle 30 so as to increase the air flow, this deficiency is compensated, and fluctuation of engine rotation speed under idle conditions is prevented.

Firstly, in steps 30–31, all sensors and idle conditions are checked, a basic DUTY which is a basic control value output to the idle control valve 29 during idle rotation is calculated, and various correction amounts are computed.

It is judged whether or not the idle switch 31 is ON, and if it is ON, an air increase volume ISCRTD when the ignition period is delayed, is computed in a step 34:

$$ISCRTD=Qshw\times ADVTMP\times ISCRTID\# \quad (5)$$

where,
Qshw=basic air volume
ISCRTID#=coefficient corresponding to torque loss when ignition period is delayed.

If the idle switch 31 is OFF, on the other hand, an air increase volume ISCRTD under non-idle conditions is calculated by the following equation in a step 35:

$$ISCRTD=Qshw\times ADVTMP\times ISCRTNI\# \quad (6)$$

Here, ISCRTNI# is a coefficient for compensating torque loss.

Next, a control output duty ISC of the idle control valve 29 is computed as follows in a step 36:

$$ISC=Basic\ DUTY+Various\ correction\ amounts+ISCRTD \quad (7)$$

The opening of the idle control valve 29 is controlled by this ISC. The larger is ISC, the larger the valve opening so that air entering the engine by bypassing the throttle 30 increases, and the engine rotation speed which decreases due to the delay of the ignition period is restored to its target value.

In a step 37, ISC is limited so that it is neither greater than ISCMAX nor less than ISCMIN.

Even if the ignition period is delayed in order to activate the three-way catalyst 16, therefore, fluctuation (decrease) of rotation speed due to decrease of engine output torque can be compensated by increasing the opening of the idle control valve 29, and stable running characteristics can be maintained.

The foregoing description of the preferred embodiments for the purpose of illustrating this invention is not to be considered as limiting or restricting the invention, since many modifications may be made by those skilled in the art without departing from the scope of the invention.

The embodiments of this invention in which an exclusive property or privilege is claimed are defined as follows:

1. An engine ignition period controller provided with a spark plug for igniting a fuel mixture supplied to said engine, an exhaust passage and a catalyst installed in said exhaust passage for cleaning the exhaust, said controller further comprising:

means for detecting engine running conditions, means for computing a basic ignition period of said spark plug from the detected running conditions, means for setting a driving region for applying a delay correction to said ignition period as required in order to activate said catalyst, means for judging whether or not said detected running conditions are within said delay correction region, means for computing a basic delay amount based on said running conditions when said running conditions are within the delay correction region, means for detecting the accelerator opening or the throttle opening, means for computing a corrected value of said basic delay amount according to said detected opening, means for correcting said basic delay amount based on said computed corrected value, means for correcting said basic ignition period based on said corrected delay amount, and means for igniting said fuel mixture by said spark plug based on said corrected ignition period.

2. An ignition period controller as defined in claim 1, wherein said means for detecting said engine running conditions comprises means for detecting engine load, engine rotation speed, and engine cooling water temperature.

3. An ignition period controller as defined in claim 1, wherein said means for detecting said running conditions comprises at least means for detecting said engine cooling water temperature, said setting means assigns a delay correction region to said engine cooling water temperature, and said judging means judges whether or not said running conditions are within a delay correction region based on said engine cooling water temperature.

4. An engine ignition period controller provided with a spark plug for igniting a fuel mixture supplied to said engine, an exhaust passage and a catalyst installed in said exhaust passage for cleaning the exhaust, said controller further comprising:

means for detecting engine running conditions, means for computing a basic ignition period of said spark plug from the detected running conditions, means for detecting a catalyst temperature, means for setting a driving region for applying a delay correction to said ignition period according to said catalyst temperature, means for judging whether or not said detected catalyst temperature is within said delay correction region, means for computing a basic delay amount based on said detected catalyst temperature when said catalyst temperature is within said delay correction region, means for detecting the accelerator opening or the throttle opening, means for computing a corrected value of said basic delay amount according to said detected opening, means for correcting said basic delay amount based on said computed corrected value, means for correcting said basic ignition period based on said corrected delay amount, and means for igniting said fuel mixture by said spark plug based on said corrected ignition period.

5. An ignition period controller as defined in claim 4, wherein said means for detecting said engine running conditions comprises at least means for detecting engine load and engine rotation speed.

6. An engine ignition period controller for an engine, the engine having a spark plug for igniting a fuel mixture supplied thereto, an accelerating means including an accelerator and a throttle valve responsive thereto, an exhaust passage and a catalyst installed in the exhaust passage for cleaning the exhaust, said controller comprising:

means for detecting engine running conditions, means for computing a basic ignition period of the spark plug from the detected running conditions, means for setting a driving region including a delay correction region for applying a delay correction to said basic ignition period as required to activate the catalyst, means for judging whether or not said detected running conditions are within said delay correction region, means for computing a basic delay amount based on said running conditions when said running conditions are within the delay correction region, accelerating condition detecting means for detecting a condition of the accelerating means of the engine and outputting an accelerating signal indicative thereof;

correction means responsive to said accelerating signal for establishing a correction value of the basic delay amount;

means for correcting said basic delay amount based on said correction value, thereby to establish a corrected delay amount;

means for correcting said basic ignition period based on said corrected delay amount to establish a corrected ignition period, and means for igniting said fuel mixture by the spark plug based on said corrected ignition period.

7. An engine ignition period controller as recited in claim 6, wherein said accelerating condition detecting means detects an accelerator opening, said correction means establishing said correction value of the basic delay amount in accordance with said accelerator opening.

8. An engine ignition period controller as recited in claim 6, wherein said accelerating condition detecting means detects an opening of the throttle valve, said correction means establishing said correction value of the basic delay amount in accordance with said opening of the throttle valve.

* * * * *